United States Patent

[11] 3,589,502

[72] Inventors Emil J. Maillet
  402 Lucas;
  Karl L. Zamberletti, R. R. #1, both of
  Danville, Ill. 61832; Elbert O. Lovett, 305
  Merrill, Catlin, Ill. 61817
[21] Appl. No. 815,100
[22] Filed Apr. 10, 1969
[45] Patented June 29, 1971

[54] CONVEYOR
  1 Claim, 7 Drawing Figs.
[52] U.S. Cl. ..................................................... 198/172
[51] Int. Cl. ..................................................... B65g 19/00
[50] Field of Search ........................................... 198/170,
  172, 173, 174, 195

[56] References Cited
UNITED STATES PATENTS
| 441,288 | 11/1890 | Coxe | 198/172 |
| 1,488,858 | 4/1924 | Arndt | 198/175 |
| 1,731,609 | 10/1929 | Brayton | 198/195 |
| 1,890,762 | 12/1932 | Whyte | 198/158 |

Primary Examiner—Richard E. Aegerter
Attorney—Peck & Peck

ABSTRACT: A chain driven conveyor apparatus. A drive end and a tail end, sprocket wheels at the drive end and wheels at the tail end having peripheries of greater width than the chains and of uniform circumferential and transverse continuity over which the chains travel. A plurality of flights pivotally connected at each end to a chain, and means at the tail end of the conveyor limiting transverse movement of each flight as it reverses its direction of travel at the tail end of the conveyor.

INVENTORS
EMIL J. MAILLET
KARL L. ZAMBERLETTI
ELBERT O. LOVETT

BY

Pech & Pech
ATTORNEYS

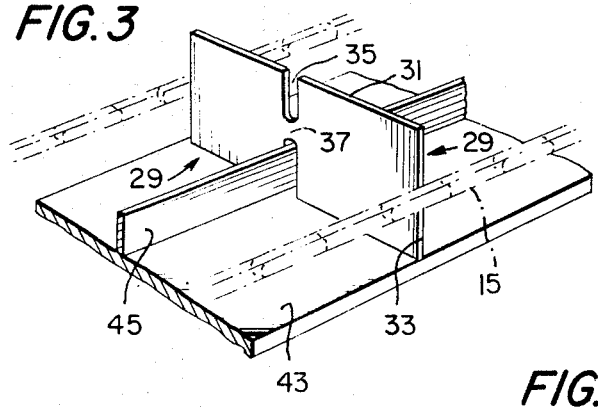
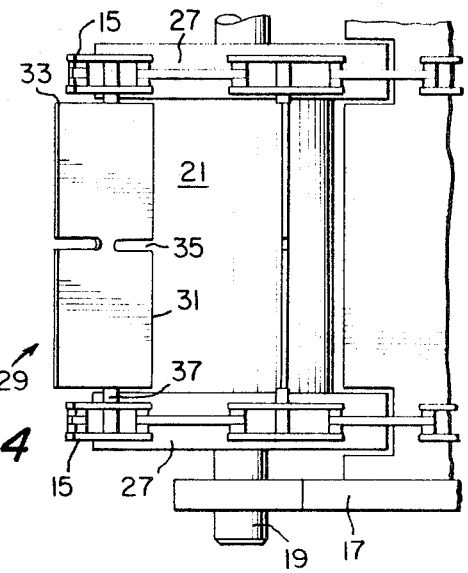
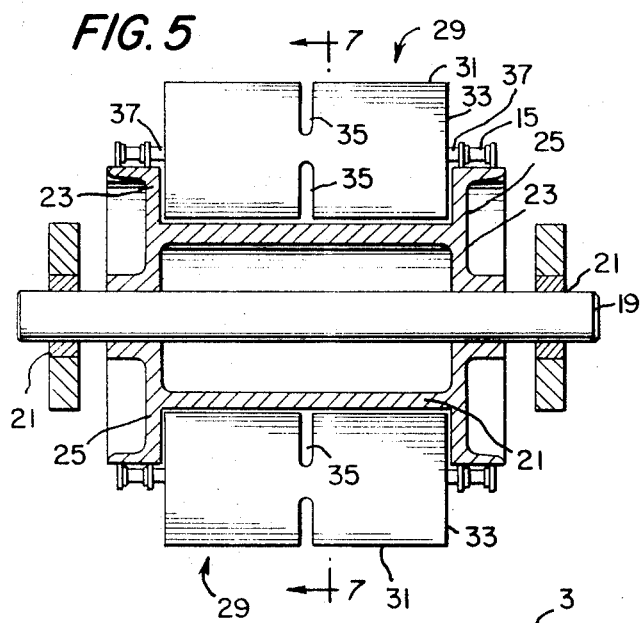
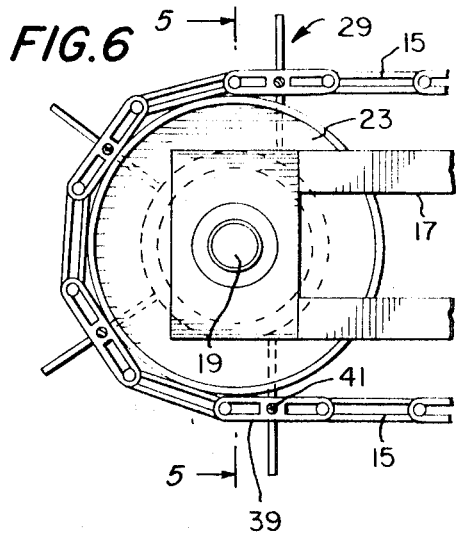
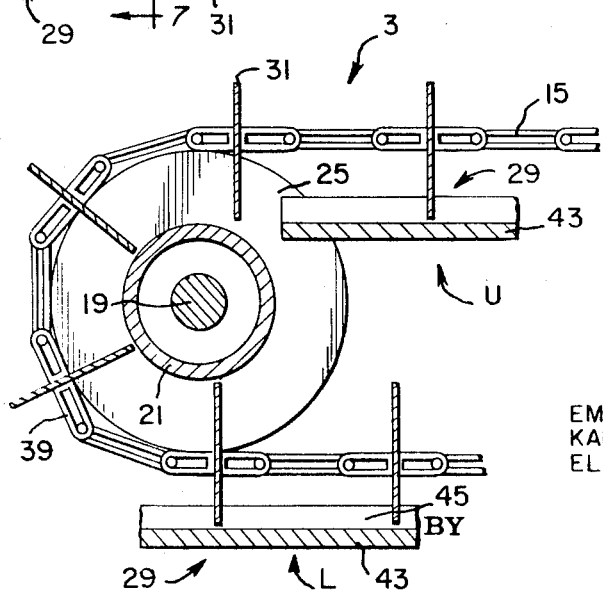
INVENTORS
EMIL J. MAILLET
KARL L. ZAMBERLETTI
ELBERT O. LOVETT
BY Peck & Peck
ATTORNEYS

CONVEYOR

This invention relates broadly to the art of chain driven conveyors, and in its more specific aspects it relates to a conveyor provided with sprocket wheels at the drive end and at the tail end sprocket wheels are eliminated, and means are provided for maintaining the chains in positions to prevent the chains from slipping or jumping off the wheels, without the sprockets, which are provided at the tail end of the conveyor; and the nature and objects of the invention will be readily recognized and understood by those skilled in the arts to which it relates in the light of the following explanation and detailed description of the accompanying drawings illustrating what we at present believe to be preferred embodiments or mechanical expressions of our invention from among various other forms, arrangements, combinations and constructions, of which the invention is capable within the spirit and scope thereof.

Conventional conveyors which embody drive chains are provided with a drive chain actuating means which usually consists of a pair of sprocket wheels, the teeth of which project into the interstices in the chains. At the tail, or inactive end of usual conveyors, the chains also ride over sprocket wheels, and considerable difficulty has been experienced at the tail end of conveyors where sprocket wheels are utilized. It will be apparent that the sprockets must be gauged to the width of spacing between the chains and, of course, the sprockets must be aligned with the chain. It is customary, at the tail end sprocket wheels, to provide one sprocket which is loose while the other sprockets are tight and immovable. This arrangement is such that the loose sprocket may slip and thereby keep the two chains in the necessary and proper alignment. It has been found that after usage the aforesaid loose sprocket customarily has a tendency to become fixed or firm on the sprocket wheel and it tightens up, thus a sprocket wheel results having no loose sprocket. Simultaneously the chains become worn and have a tendency to stretch so that one chain on one side becomes longer than the chain on the other side, and thus is looser than the chain on the other side. This action of the chains causes a misalignment thereof on the sprockets, and since the loose chain can't slip there is a tendency for the chain to jump off the sprocket wheel which results many times in broken chains and substantial loss of time and shutdown of the operation due to the inability of the conveyor to properly function.

We have overcome this difficulty of prior art conveyors, of this general type, in a simple, inexpensive and efficient manner.

The conveyors, for which our invention has been specifically designed, are used in the tipples of coal mines, and generally embody an elongated trough in which the coal is disposed and the coal is moved by the conveyor along the trough by means of a plurality of longitudinally spaced apart metallic flights which extend between and are pivotally connected to the two transversely spaced drive chains of the conveyor, and cause the coal, other material to travel.

While our conveyor apparatus has been designed for use in the tipples of coal mines, it is to be distinctly understood that the improvements embodied herein may be combined with any conveyor regardless of its use, and will fall within the spirit and scope of this invention.

The aforesaid, and other problems which are encountered in the use of conventional conveyors at the tail end thereof, have been eliminated in this development, due to out construction whereby the sprockets are omitted at the tail end of the conveyor, and instead of the sprockets a wheel is mounted on each end of a shaft and the chains travel about these wheels. The periphery of each wheel is generally smooth, and of uniform circumferential and transverse continuity, and of greater width than the width of the chain, and is not provided with the sprockets, as in conventional tail end conveyor construction. Thus, the necessity for the loose and firm sprockets at the tail end has been eliminated so that the operational troubles mentioned above are not experienced when using this conveyor apparatus. The flights are of generally elongated configuration, having longitudinal and transverse edges, and each flight is pivotally connected intermediate the ends of the transverse edges to the chains, so that substantially half of each flight depends below the planes of the chains.

The organization, at the tail end of our conveyor, includes means which functions to limit the transverse movement of the flights to thereby maintain the chains on the peripheries of the wheels.

In the development of this apparatus we have devised an arrangement which will require substantially no maintenance and will insure continuous operation of the conveyor so that the tipple will not have to be shut down for repairs, and the like, as is the case with conventional apparatus of this type.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 3 is a view in perspective disclosing one of the flights in operative position in the conveyor, and causing the material to travel in the conveyor.

FIG. 4 is a top plan view of the tail end of the conveyor.

FIG. 5 is a view taken on the line 5–5 of FIG. 6.

FIG. 6 is a side view in elevation of the tail end of the conveyor.

FIG. 7 is a view taken on the line 7–7 of FIG. 5, with parts of each flight being broken away.

Figure 1:
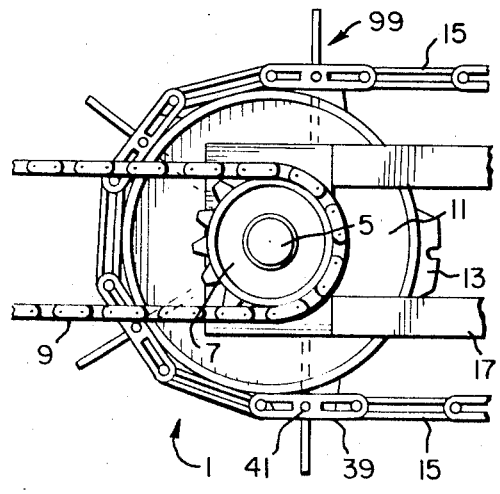
FIG. 1 is a view illustrating the drive end of a conveyor and the tail end thereof, parts between these ends being broken away.
Figure 1:
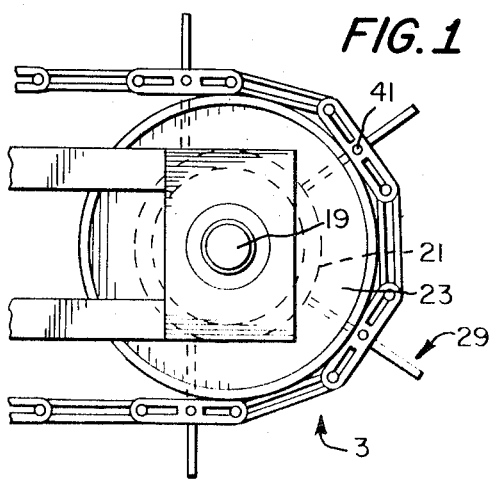
Figure 2:
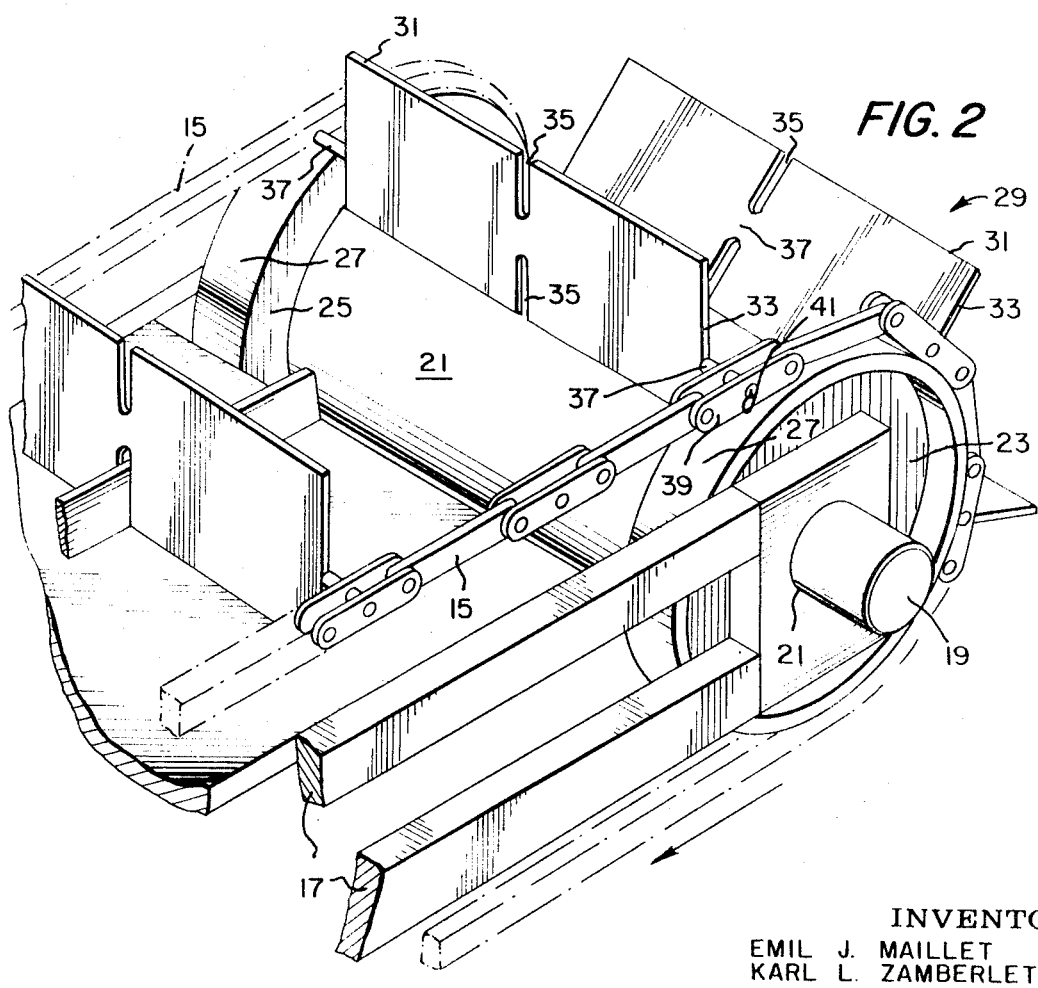
FIG. 2 is a view in perspective illustrating the tail end of the conveyor.

In the accompanying drawings, and particularly in FIG. 1 thereof, I have used the numeral 1 to designate, in its entirety, the drive end of the conveyor and the numeral 3 to designate, in its entirety, the tail, or idle, end thereof. At the drive end of the conveyor I provide a drive shaft 5 having any suitable type of sprocket wheel, or gear, 7 fixed thereto which is driven by means of a drive chain or the like 9. It will be understood that any suitable drive means for the drive end of the conveyor may be employed. Fixed to the drive shaft 5 are a pair of sprocket wheels 11, only one of such sprocket wheels being shown in the drawings, and each sprocket wheel is provided with projecting sprockets 13 on the periphery thereof. The conveyor apparatus is provided with a pair of drive chains 15, formed of a plurality of pivotally connected links, which extend over each drive wheel 11 and each is in driving intermeshing relation with the sprockets 13 for driving the chains for operation of the conveyor apparatus. The drive shaft 5 is journaled in any suitable manner in a framework 17, the framework being positioned on each side of the apparatus.

We provide a shaft 19 at the tail end of the conveyor and this shaft is journaled as at 21 in the framework 17, and it will be understood that the framework 17 and journaling of the shaft 19 is provided at each side of the conveyor. Fixed to the shaft 19 is a cylindrical drum 21, and at each end of the drum I provide wheels 23 which ARE of substantially greater diameter than the diameter of the drum 21, so that an ANNULAR flangelike portion 25 radially extends outwardly from the circumferential surface of the drum.

While we we have illustrated the wheels 23 as being fixed to each end of a drum it is to be appreciated that this is merely by way of example and not as a limitation, for it is within our contemplation to merely utilize the shaft 19 thereby eliminating the drum.

The periphery 27, of each wheel 23, is of uniform circumferential and transverse continuity to provide a smooth annular surface.

Each chain 15 at the drive end of the conveyor intermeshes with the sprockets 13 on the sprocket wheel 11, so that the chains, when the sprocket wheels are rotated, will be caused to travel, and the chains 15 at the tail end of the conveyor extend over the smooth peripheral surfaces 27 of the wheels, as is clearly illustrated in FIGS. 4 and 5 of the drawings. It is significant that the greatest width of the links of the chain is less than the width of the peripheral surface 27 of the wheels, for purpose which will be hereinafter described.

A plurality of elongated platelike flights are provided, and we have designated these flights in their entirety by the numeral 29. Each flight 29 is formed with longitudinal edges 31 and transverse edges 33 connecting said longitudinal edges. For a purpose which will hereinafter become clear, each flight is provided with a pair of aligned slots 35, each of which extends inwardly from a longitudinal edge 31 and the inner end of each slot, of the pairs of slots, are spaced apart leaving a solid area 37.

Each flight 29, of the plurality of flights which causes the material in the conveyor to travel therein, is provided at each transverse end 33 with a projecting pivot pin 37, each such pivot pin being fixed to and extending from the transverse end 33 of each flight substantially intermediate with respect to the longitudinal edges 31 of the flights. Each pivot pin 37 is pivotally fixed to its complementary chain 15 to a double link 39 thereof as at 41, and consideration of the drawings clearly indicates that the flights are pivotally connected to the chains in such manner that the flights are spaced apart longitudinally of the chains.

It will be evident from the drawings and particularly from FIG. 5 thereof that the manner of pivotally mounting the flights on and extending between the two chains is such that substantially one-half of each flight extends in a plane below an extended horizontal plane between the chains, and the transverse width of each flight is such that a longitudinal edge of each flight does not come in engagement with the circumferential exterior surface of the cylindrical drum 21 as the flights reverse their direction of travel at the tail end of the conveyor.

It is significant to recognize that the longitudinal dimension of each elongated flight, including the length of each pivot pin 37 to a point where each pivot pin engages the chain, is substantially equal to the distance between the chains.

As we have stated above, one of the significant characteristics of our invention resides in the elimination of sprockets on the wheels at the tail end of the conveyor and by eliminating such sprockets we have overcome the problems mentioned above which are inherent in prior art conveyors wherein sprockets are employed for meshing with the chains at the tail end of the conveyor. In achieving our highly advantageous purposes, which among other advantages, prevent the chains from slipping off the peripheries of the wheels 23, we have made each flight of a longitudinal dimension and have so mounted the flights on the chains, that at the tail end of the conveyor substantially one-half of each flight extends in the area between the annular flanges 25 of the wheels, and the transverse edges of the flights are closely adjacent to the inner opposing surfaces of the annular flanges 25, so that the lateral play, or movement, of each flight at the tail end of the conveyor, as it reverses its direction of travel, is limited since one or the other transverse edge will engage one or the other annular flange, to thereby prevent any substantially lateral movement of either chain which would result in one or both of the chains jumping off the peripheral surface of one or the other wheel. The fact that the peripheral surface 27 of the wheels 23 is wider than the greatest width of a link of the chains permits this limited lateral play of the flights without either or both chains jumping off the peripheral surface of the wheels. Thus, it is this combination of elements and mechanisms, and their relative positions with respect to each other at the tail end of the conveyor, which affords the desirable construction whereby the sprockets at this end of the conveyor may be eliminated.

In FIG. 7 of the drawings we have illustrated one form which the conveyor may take, this is merely by way of example, and not to be construed as a limitation. The conveyor is provided with a floor or bed 43 which is centrally divided by a partition 45 which as will be apparent in FIG. 3 of the drawings extends into the slots 35 of the flights 29. By dividing the conveyor into two travel channels for the material, it will be evident that at least two different classes, sizes or the like of material may be conveyed by the conveyor at one time.

In many installations of this character there is, what we shall term an upper and a lower conveyor so that one conveyor apparatus may handle more material and thereby greatly facilitate the operation. In FIG. 7 of the drawings we have shown what we shall call an upper conveyor "U" and a lower conveyor "L," each such conveyor channels being of generally the same construction as illustrated in FIG. 3 of the drawings. Thus, the material will be caused to travel in the upper conveyor by operation of the flights and then, when the flights reverse their direction of travel at the tail end of the conveyor, the flights will extend into the lower conveyor "L" and material therein will be caused to travel in the opposite direction from the material in the upper conveyor.

We claim:

1. A conveyor apparatus including, in combination, a conveyor bed on which material may be moved along a substantial horizontal plane a drive end and a tail end, a pair of spaced apart chain drive sprocket wheels at the drive end of the conveyor and a pair of spaced apart wheels at the tail end and thereof, a pair of drive chains, one extending between and over a chain drive wheel of the pair of chain drive wheels and a wheel of the pair of wheels, and the other chain extending over the other chain drive wheel and the other wheel, the sprockets of each chain drive wheel extending into the interstices of each chain whereby each chain is driven by the chain drive sprocket wheels, and the wheels at the tail end of the conveyor having peripheries of uniform circumferential and transverse continuity and the peripheries of the wheels at the tail end of the conveyor being of greater width than the width of the chain, and a plurality of generally rectangular elongated flights are provided having longitudinal and transverse edges and being connected at each transverse edge to a chain and extending therebetween, the flights being spaced apart longitudinally with respect to the chains and the flights being so connected to the chains providing substantially one-half of each flight extending in a plane below a projected horizontal plane between the chains, and each of said wheels at the tail end of the conveyor being provided with a portion in the same horizontal plane as that in which said one-half of each flight is positioned, each transverse edge of each of said one-half of each flight being normally spaced from said portions, one transverse edge of a flight being engageable with one of said portions upon lateral movement of the flight in one direction, and the other transverse edge of the flight being engageable with the other of said portions upon lateral movement of the flight in the opposite direction, and the greater width of the peripheries of the wheels at the tail end of the conveyor being substantially equal to the distance each transverse edge of a flight is normally spaced from each portion of each wheel at the tail end of the conveyor.